(12) United States Patent
Li et al.

(10) Patent No.: US 7,697,076 B2
(45) Date of Patent: Apr. 13, 2010

(54) TV SET WITH A PARENTAL GUIDE MODE

(75) Inventors: Xiao-Guang Li, Guangdong (CN); Kuan-Hong Hsieh, Guangdong (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 925 days.

(21) Appl. No.: 11/309,328

(22) Filed: Jul. 27, 2006

(65) Prior Publication Data

US 2007/0076119 A1 Apr. 5, 2007

(30) Foreign Application Priority Data

Aug. 5, 2005 (CN) .................... 2005 1 0036434

(51) Int. Cl.
*H04N 7/16* (2006.01)
*H04N 5/44* (2006.01)

(52) U.S. Cl. .................. 348/725; 348/553; 725/29; 725/25; 725/27

(58) Field of Classification Search ......... 348/553–570, 348/731, 734, 725; 725/25–31
See application file for complete search history.

(56) References Cited

U.S. PATENT DOCUMENTS

| 5,382,983 | A | | 1/1995 | Kwoh et al. |
| 5,548,345 | A | * | 8/1996 | Brian et al. ............... 725/27 |
| 5,828,402 | A | * | 10/1998 | Collings ................. 725/28 |
| 6,944,876 | B1 | | 9/2005 | Whitelaw |
| 2002/0095673 | A1 | | 7/2002 | Leung et al. |
| 2003/0070166 | A1 | | 4/2003 | Johnson |
| 2004/0221303 | A1 | | 11/2004 | Sie et al. |

FOREIGN PATENT DOCUMENTS

CN 1299558 A 6/2001

* cited by examiner

*Primary Examiner*—M. Lee
(74) *Attorney, Agent, or Firm*—Winston Hsu

(57) ABSTRACT

A TV set (20) with a parental guide mode is provided in accordance with a preferred embodiment. The TV set includes: a mode switching unit (204) for switching the TV set between a normal mode and the parental guide mode, under the normal mode the TV set being capable of broadcasting all channels and under the parental guide mode the TV set be capable of broadcasting one or more predetermined viewable channel(s); a memory (209) for storing identifier(s) of the predetermined viewable channel/channels; and a MCU (202) for controlling the TV set to broadcast the viewable channel/channels under the parental guide mode according to the identifier(s) of the predetermined viewable channel/channels stored in the memory.

4 Claims, 3 Drawing Sheets

TV SET WITH A PARENTAL GUIDE MODE

TECHNICAL FIELD

The present invention relates to television sets, and particularly to a television set provided with a parental guide mode, in which the television set is limited to some viewable channels.

RELATED ART

With the ongoing development of TV technology, especially with the advent of cable TV and satellite TV, rich and colorful programs have been brought to homes and have strongly attracted viewers. People spend much time watching television to entertain oneself as well as to acquire knowledge. However, watching TV should be minimized. The reasons are as follows:

First of all, watching TV for long time affects viewers' physical health, especially affecting viewers' eyes. Scientists have found out that prolonged exposure to artificial light may alter human cells, thus pose a danger to human health. Therefore, life-long TV exposure might well be a physical risk to human beings.

Secondly, a growing number of movies and shows display violence and sex for a sensational effect. However, a spectrum of viewers, such as children may take this as granted, blindly portraying impossible acts shown on TV in real life.

Children commonly have less self-control and weaker abilities to distinguish right from wrong. They may acquire wrong experiences from the TV without adult supervision. However, adults are usually busy making a living and may have little time to guide and supervise their children, resulting in that the children are without proper guidance when watching TV.

Therefore, there is a need for providing parents with a solution to guide their children even when the parents are not present while the children are watching TV.

SUMMARY

A TV set with a parental guide mode is provided in accordance with a preferred embodiment. Under the parental guide mode the TV set broadcasts one or more predetermined viewable channel(s). The TV set includes: a memory for storing a parental guide time schedule, during which the TV set is allowed to broadcast the predetermined viewable channel(s) while in the parental guide mode; a timer device for recording real time; and a micro controller unit (MCU) for enabling the TV set to broadcast the viewable channel(s) if the real time recorded by the timer device falls within the parental guide time schedule, and disenabling the TV set to broadcast otherwise.

In a second embodiment, the memory is further used to store a parental guide time limit for each broadcast and a parental guide suspend duration for each suspension under the parental guide mode. The MCU further determines whether a current broadcast reaches the parental guide time limit or a current suspension reaches the parental guide suspend duration, based on the real time, and discontinues the current broadcast if the current broadcast reaches the parental guide time limit or begin a broadcast if the current suspension reaches the parental guide suspend duration.

In a third embodiment, the memory is only used for storing a parental guide time limit for each broadcast and a parental guide suspend duration for each suspension under the parental guide mode. A timer unit is employed for recording time information; and the MCU is used for determining whether a current broadcast reaches the parental guide time limit or a current broadcast reaches the parental guide suspend duration, based on the time information, and discontinuing the current broadcast if the current broadcast reaches the parental guide time limit or beginning a broadcast if the current suspension reaches the parental guide suspend duration.

Other advantages and novel features will be drawn from the following detailed description with reference to the attached drawings, in which:

DETAILED DESCRIPTION

Figure 1:
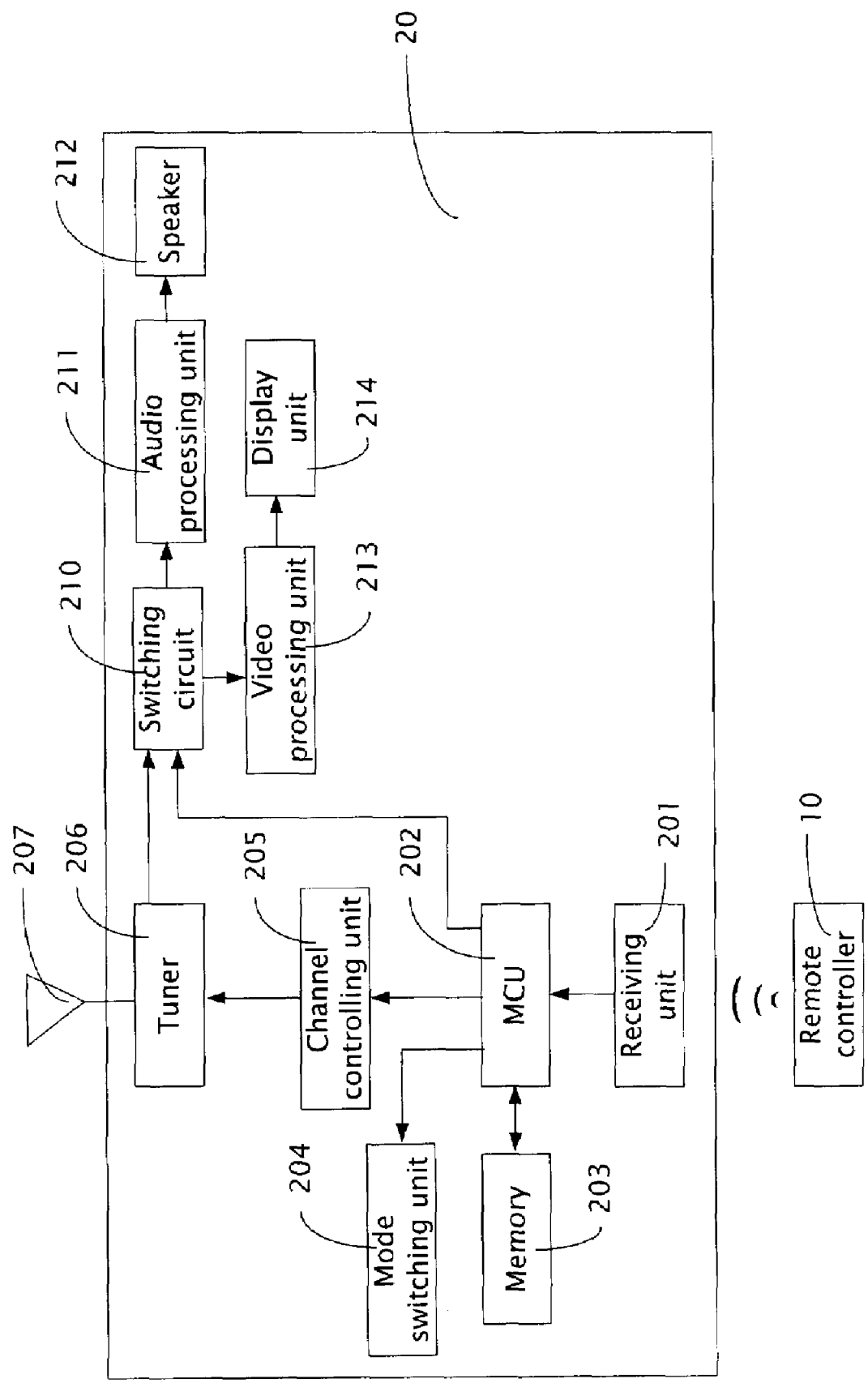
FIG. 1 depicts a schematic block diagram of a TV set with a parental guide mode in accordance with a preferred embodiment of the present invention.

Referring to FIG. 1, a schematic block diagram of a TV set with a parental guide mode in one embodiment is shown. The TV set 20 uses an antenna 207 to receive a plurality of television signals. The antenna 207 transmits the received television signals to a tuner 206. The tuner 206 selects a television signal based upon a channel select command. The selected television signal is then divided into an audio signal and a video signal. The audio signal is sequentially transmitted to an audio processing unit 211 for processing and finally broadcasted by a speaker 212. Simultaneously, the video signal is sequentially transmitted to a video processing unit 213 and finally broadcasted by a display unit 214.

The TV set 20 receives commands including channel select commands from a remote control 10. The commands produced by the remote control 10 are picked up by a receiving unit 201 of the TV set 20 and are transmitted to a Micro-Controller Unit (MCU) 202 for processing. The MCU 202 cooperates with a memory 203 and controls the tuner 206 to select the desired television signal in accordance with the channel select commands.

The TV set 20 includes a mode switching unit 204. The mode switching unit 204 connects with the MCU 202 and is used for switching the TV set 20 between a normal mode and a parental guide mode. According to the exemplary embodiment, under the normal mode, users are free to view any channels that the TV set 20 can receive, including any so-call "favorite channels" that are manually defined by the users or automatically generated. However, under the parental guide mode, in this embodiment, the users are limited to view only one or several channel(s) that is/are predetermined beforehand (hereinafter referred to as "the viewable channel(s)"). Channel numbers or other identifiers of the viewable channel(s) is/are stored in the memory 203 and used to identify the viewable channel(s) when the TV set 20 is switched to the parental guide mode.

In the preferred embodiments, the mode switching is activated by mode switching commands of the TV set 20 by a controller, such as the remote control 10 or any other suitable device, such as control buttons situated on a front panel of the TV set 20. The mode switching commands from the remote control 10 are received by the receiving unit 201 and forwarded to the mode switching unit 204 via the MCU 202. The mode switching commands causes the mode switching unit 204 to display a user interface on a TV screen of the TV set 20, to prompt the users to enter a password. The mode switching unit 204 compares the password entered by the users with a preset password stored in the memory 203, and switches the TV set 20 between the two modes: the normal mode and the parental guide mode, if the password entered by the users is consistent with the preset password.

If no parental guide mode is preset and the users activates a mode switching button on the remote control 10 or any other suitable device, such as on the front panel of the TV set 20, another user interface is displayed on the TV screen by the mode switching unit 204. This user interface allows the users to set information on the parental guide mode, using the remote control 10 or any other suitable device. Such information is stored in the memory 203 and includes channel numbers or other identifiers of the viewable channel/channels that the users want to view under the parental guide mode.

The information may further include one or more time period/periods of each day (hereinafter referring to as "the parental guide time schedule") during which the users want to watch TV, as well as time durations for each broadcasting time length (hereinafter referring to as "the parental guide time limit") and each broadcasting break (hereinafter referring to as "the parental guide suspend duration").

If the parental guide mode is preset and more than one of the viewable channel is included, when users activate a channel up button or a channel down button on the remote control 10 or any other suitable device, a channels switching unit 205 switches the TV set 20 between the viewable channels.

The TV set 20 may further include a switching circuit 210 interposed among the tuner 206, the audio processing unit 211 and the video processing unit 213. Once the TV set 20 is under the parental guide mode, if the users enter a channel number of a channel different from the viewable channel(s), in one situation, the MCU 202 controls the channel switching unit 205 to ignore the switching intention of the users, thus the TV set 20 continues broadcasting a current viewable channel; in another situation, the MCU 202 controls the switching circuit 210 to be off, thus the TV set 20 broadcasts nothing to the users.

Figure 2:
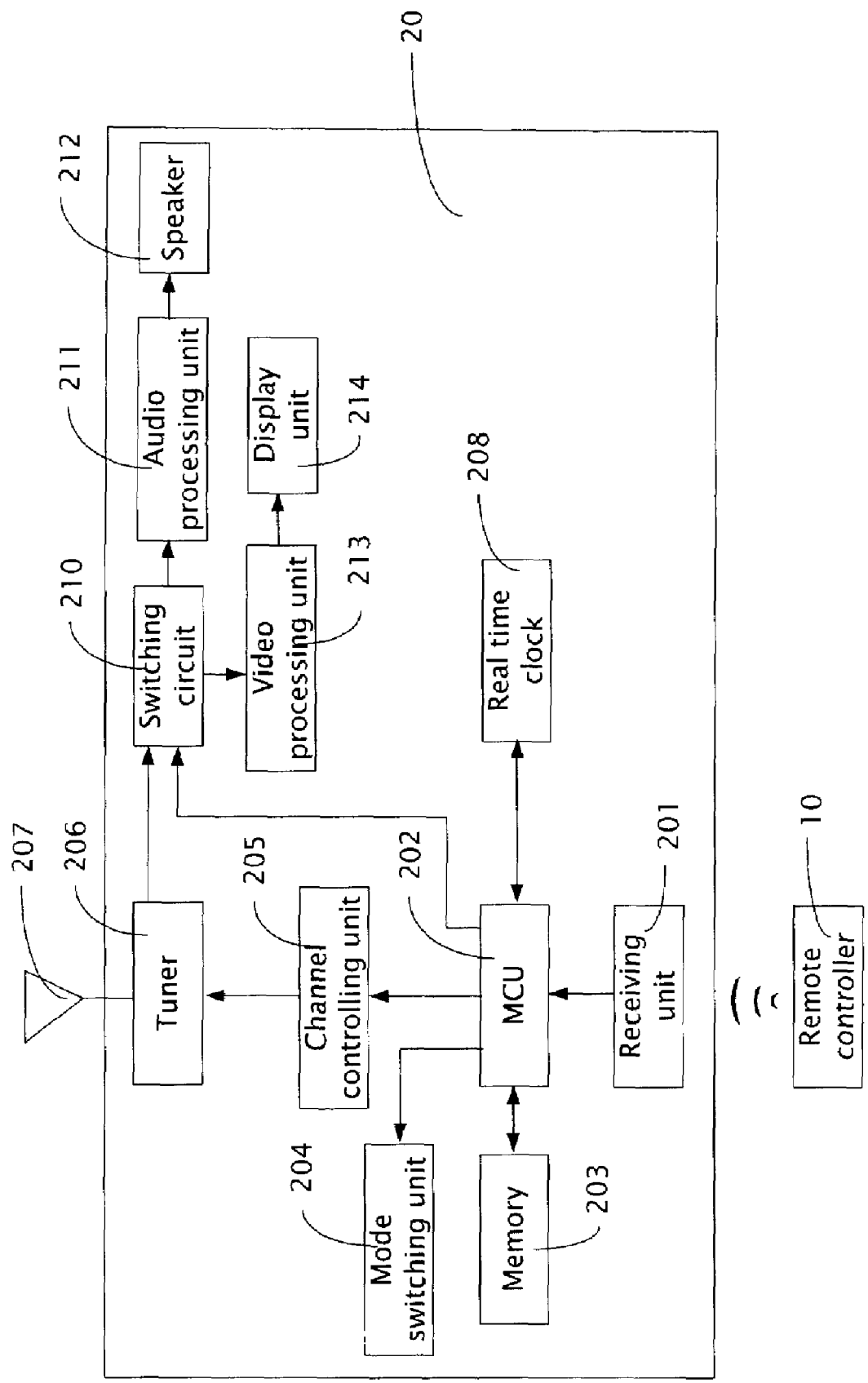
FIG. 2 depicts a schematic block diagram of the TV set with a parental guide mode in accordance with another preferred embodiment of the invention.

Referring to FIG. 2, a schematic block diagram of a TV set with a parental guide mode in another embodiment is shown. In this embodiment, the TV set 20 further includes a battery-driven real time clock 208 or a similar timer device that is used to record real time. The MCU 202 obtains the real time from the real time clock 208 or the similar timer device and determines whether the viewable channel(s) is/are allowed to view according to the real time and the preset parental guide time schedule, under the parental guide mode. If the real time currently recorded by the real time clock 208 or the similar timer device falls within the parental guide time schedule, the switching circuit 210 is turned on and the users are permitted to watch the viewable channel(s). Otherwise, the users are prevented from watching TV with the TV set 20.

Further, the MCU 202 may register a begin time of a current broadcast, compare the begin time with the real time, and determine whether the current broadcast reaches the parental guide time framelimit based on the comparison result. If not, the MCU 202 allows the current broadcast to continue. Otherwise, the MCU 202 cuts off the current broadcast by switching off the switching circuit 210.

The MCU 202 may also register a begin time of a current suspension once the current broadcast is stopped and the current suspension begins. The MCU 202 determines whether the current suspension reaches the parental guide suspend duration according to the begin time of the current suspension and the parental guide suspend duration. If the current suspension reaches the parental guide suspend duration, the current suspension is ceased, another broadcast time begins, and the MCU 202 automatically switches on the switching circuit 210 if the TV set 20 is still powered on.

Figure 3:
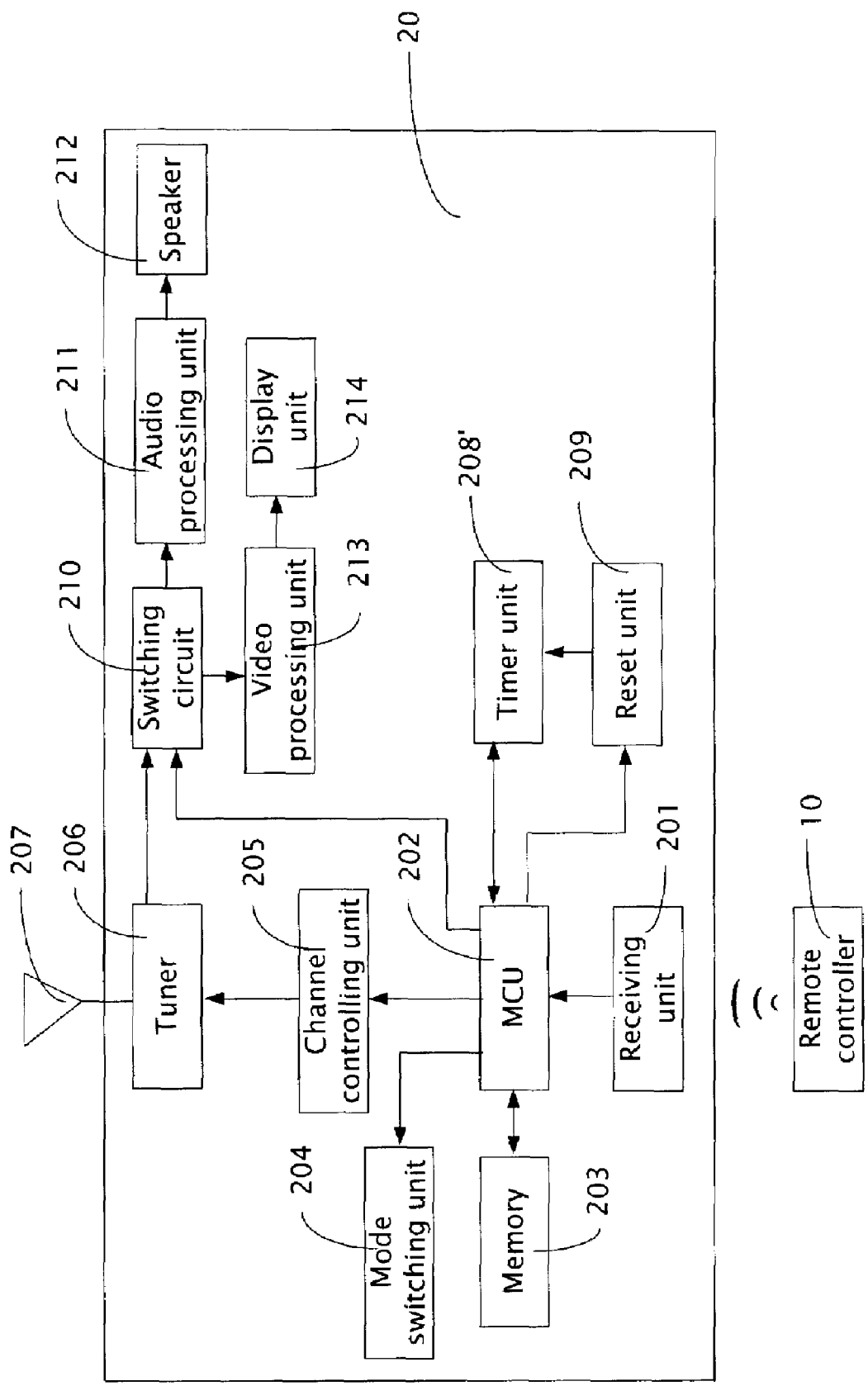
FIG. 3 depicts a schematic block diagram of the TV set with a parental guide mode in accordance with a third preferred embodiment of the invention.

Referring to FIG. 3, a schematic block diagram of a TV set with a parental guide mode in a third embodiment is shown. In this embodiment, the TV set 20 further includes a battery-driven timer unit 208' under control of the MCU 202 to record time information. The timer unit 208' may be a count up timer device that tracks up to a set of particular time passages that respectively corresponds to the parental guide time limit and the parental guide suspend duration. The timer unit 208' may also be a count down timer device that counts down from a set of particular time variables respectively corresponding to the parental guide time limit and the parental guide suspend duration. The timer unit 208' may further be a combination of a count up timer device and a count down timer device. Said count up timer device tracks up to a particular number that corresponds to one of the parental guide time limit and the parental guide suspend duration. And said count down timer device tracks down from a particular number that corresponds to another of the parental guide time limit and the parental guide suspend duration. The MCU starts the timer unit 208' to record time information of each broadcast and each suspension in turn. After each completed time counting task, the timer unit 208' produces a signal to the MCU 202. The MCU 202 correspondingly switches the switching circuit 210 on or off, thus to stop the broadcast or resume the broadcast in accordance with the signal. The TV set 20 further includes a reset unit 209. The reset unit 209 is under control of the MCU 202 to reset the timer unit 208' each time the timer unit 208' completes the timing task.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A television (TV) set with a parental guide mode, under which the TV set broadcasts one or more predetermined viewable channel(s), the TV set comprising:
   a memory for storing a parental guide time schedule, a parental guide time limit for each broadcast, and a parental guide suspend duration for each suspension, wherein during the parental guide time schedule, the TV set is allowed to broadcast the predetermined viewable channel(s) while in the parental guide mode;
   a timer device for recording real time; and
   a micro controller unit (MCU) for enabling the TV set to broadcast the viewable channel(s) if the real time recorded by the timer device falls within the parental guide time schedule, and disenabling the TV set to broadcast otherwise, wherein during the parental guide time schedule, if the duration of a current broadcast reaches the parental guide time limit, based on the real time, the MCU discontinues the current broadcast; and during the parental guide time schedule, if the duration of a current suspension reaches the parental guide suspend duration, based on the real time, the MCU begins a broadcast.

2. The TV set as claimed 1, further comprising a switching circuit under control of the MCU to be switched on or off, thus to continue or discontinue the TV set to broadcast while in the parental guide mode.

3. A television (TV) set with a parental guide mode, under which the TV set broadcasts one or more predetermined viewable channel(s), the TV set comprising:
- a memory for storing a parental guide time limit for each broadcast and a parental guide suspend duration for each suspension under the parental guide mode;
- a timer unit for recording time information; and
- a microcontroller unit (MCU) for determining whether a current broadcast reaches the parental guide time limit or a current broadcast reaches the parental guide suspend duration, based on the time information, and discontinuing the current broadcast if the duration of the current broadcast reaches the parental guide time limit or beginning a broadcast if the duration of the current suspension reaches the parental guide suspend duration.

4. The TV set as claimed in claim 3, further comprising a switching circuit under control of the MCU to be switched on or off, thus to continue or discontinue the TV set to broadcast while in the parental guide mode.

* * * * *